United States Patent [19]

Bernstein

[11] Patent Number: 5,627,341

[45] Date of Patent: May 6, 1997

[54] ELECTRICAL CABLE RACEWAY ASSEMBLY FOR REPOSITIONING AN ELECTRICAL FIRE ALARM PULL STATION ON A WALL

[76] Inventor: David S. Bernstein, 4937 Northwest Foxworth Ave., Port St. Lucie, Fla. 34983

[21] Appl. No.: 570,736

[22] Filed: Dec. 12, 1995

[51] Int. Cl.⁶ .................................................. H02G 3/10
[52] U.S. Cl. .............................. 174/49; 174/48; 174/66; 200/331
[58] Field of Search .................. 174/48, 49, 50, 174/66, 67; 220/3.3, 241, 242; 200/331, 336; 187/395

[56] References Cited

U.S. PATENT DOCUMENTS

| | | | |
|---|---|---|---|
| 3,895,179 | 7/1975 | Wyatt | 174/50 |
| 4,017,137 | 4/1977 | Parks | 339/21 R |
| 5,448,031 | 9/1995 | Concannon et al. | 200/331 |
| 5,490,581 | 2/1996 | Warner et al. | 187/395 X |

*Primary Examiner*—Kristine L. Kincaid
*Assistant Examiner*—Dean A. Reichard
*Attorney, Agent, or Firm*—Donald A. Kettlestrings

[57] ABSTRACT

A raceway assembly is provided for repositioning an electrical fire alarm pull station from a first position to a second lower position on a wall. The assembly covers the opening in the wall at the first position so that patching of the opening at the first position is not necessary. The assembly also covers the electrical wiring which extends from the first position to the second position within the assembly, and the assembly has a low side profile to provide a pleasing appearance and minimal intrusion into the adjacent hallway or room space.

10 Claims, 3 Drawing Sheets

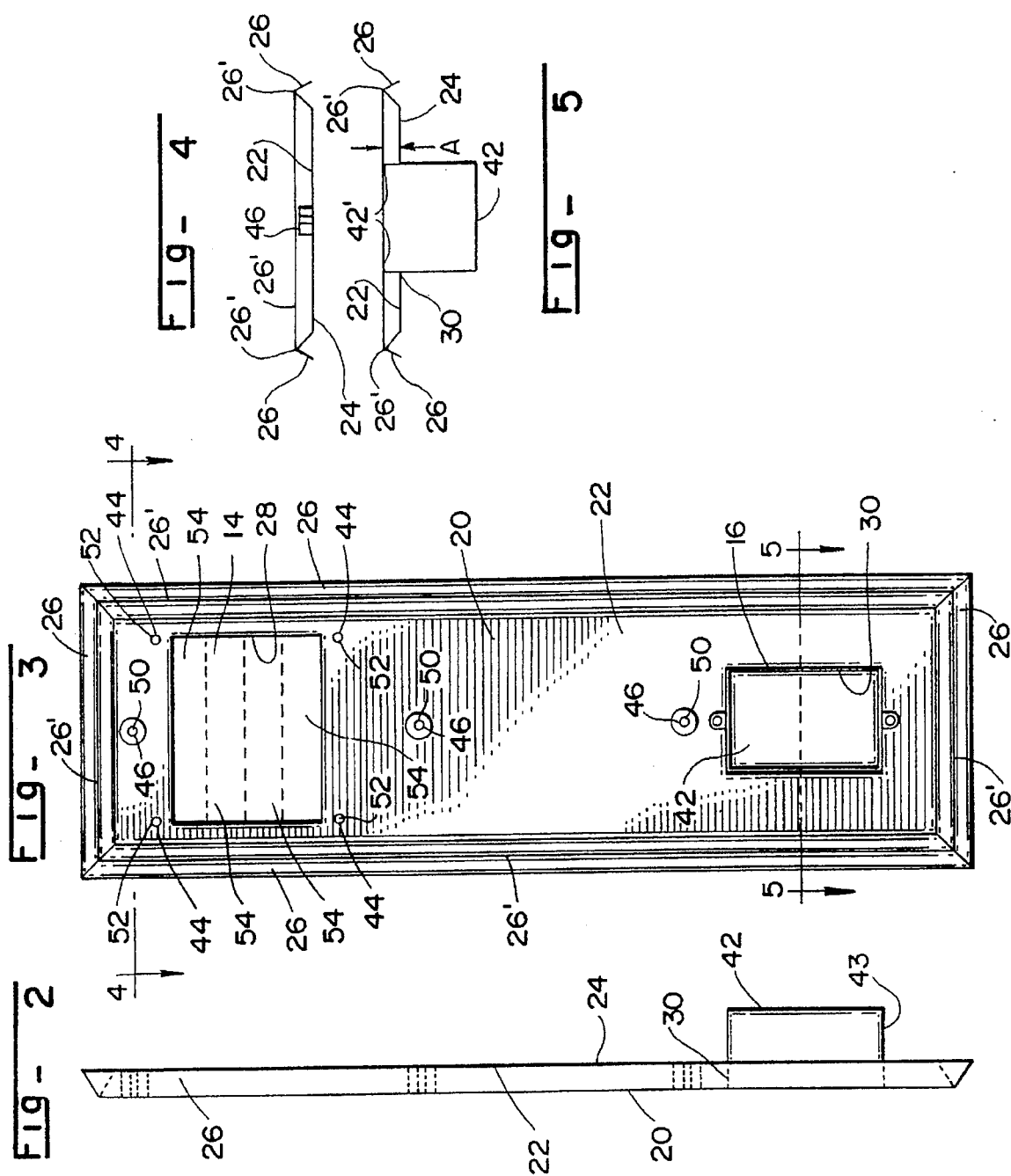

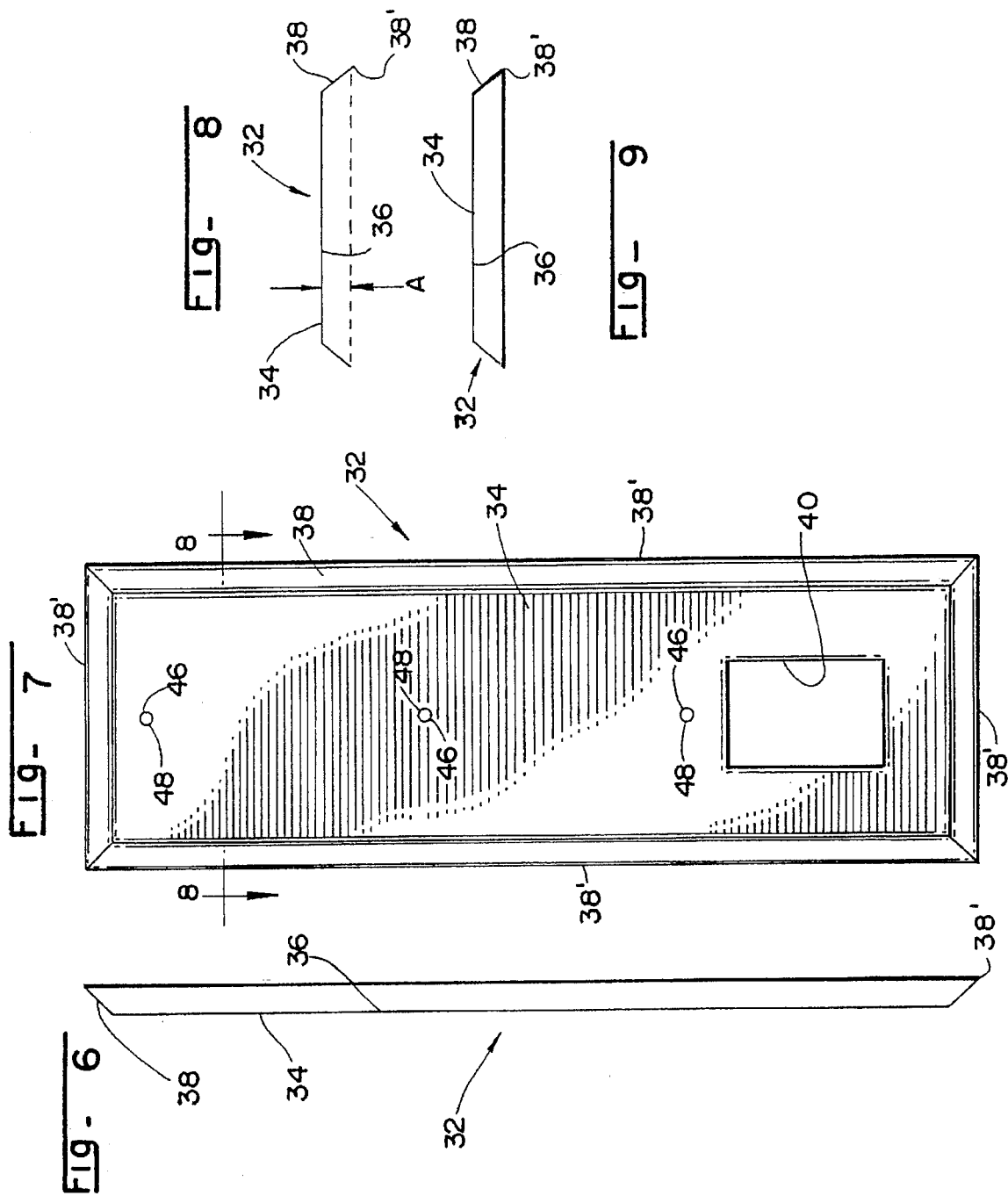

ELECTRICAL CABLE RACEWAY ASSEMBLY FOR REPOSITIONING AN ELECTRICAL FIRE ALARM PULL STATION ON A WALL

BACKGROUND OF THE INVENTION

This invention relates to electrical cable raceways and more particularly to a raceway assembly for quickly and easily repositioning an electrical fire alarm pull station on a wall.

Fire alarm pull stations typically are located at a height of fifty-four inches to fifty-eight inches from the floor. The federal Americans With Disabilities Act (ADA) regulations now require that fire alarm pull stations be located at a height of no more than forty-eight inches from the floor so that persons seated in wheelchairs can reach and activate the pull stations.

Various procedures and devices have been used to reposition existing fire alarm pull stations to comply with ADA regulations, but these procedures and devices have disadvantages. For example, the conventional procedure for repositioning the fire alarm pull station on a wall requires that a new hole be created in the wall at the height of approximately forty-eight inches from the floor. The fire alarm pull station is then removed from its original location and is repositioned and rewired in the new opening. The opening remaining at the original location of the fire alarm pull station must then be patched, and new conduit may be required to provide electrical power to the new position.

Mechanically operated add-on devices have also been proposed for mechanically connecting to the fire alarm pull station. These devices typically are provided with handles or other actuating configurations which are connected to and extend downwardly from the pull station and which are located at the required height of forty-eight inches above the floor. The problem with these devices is that the fire alarm pull station is mechanically operated and the add-on devices are also mechanically operated. As a result, the risk of mechanical failure increases.

It is, therefore, an object of the present invention to provide a raceway assembly for quickly and easily repositioning an electrical fire alarm pull station on a wall.

Another object is to provide such an assembly which reduces the cost of repositioning the fire alarm.

A further object of the invention is the provision of such an assembly which has a low side profile so as to project outwardly only a relatively small distance from the wall surface. This provides a pleasing appearance and minimum intrusion into the adjacent hallway or room space.

Still another object is to provide such an assembly which enables a fire alarm pull station to be repositioned on a wall without requiring patching of existing openings in the wall.

Yet another object of the present invention is the provision of a raceway assembly which does not increase the risk of mechanical failure of the fire alarm pull station after the pull station has been repositioned on the wall.

Another object of the present invention is to provide such an assembly that covers the electrical wiring which extends from the original wall position of the fire alarm pull station to the new position of the pull station.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a raceway assembly for repositioning an electrical fire alarm pull station from a first position to a second position on a wall, the assembly comprising: a base plate defining a first front substantially flat surface, a second opposed rear substantially flat surface, a first bevelled edge surrounding the surfaces, a first opening and a second opening; a cover plate defining a third front substantially flat surface, face, a fourth opposed rear substantially flat surface, a second bevelled edge surrounding the third and fourth surfaces and a third opening; an electrical junction box positioned within and extending through the second opening and attached to the base plate; first means in operative relationship with the base plate for attaching the base plate to the wall with the first opening located at the first position and with the junction box located at the Second position; and second means in operative relationship with the cover plate and with the base plate for attaching the cover plate to the base plate with the junction box positioned at the third opening.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 2 is a side elevation view showing the base plate and the electrical junction box of the assembly;

FIG. 3 is a front elevation view showing the base plate and the electrical junction box of the assembly;

FIG. 4 is a cross-sectional view taken along the line 4—4 in FIG. 3 and looking in the direction of the arrows;

FIG. 5 is a cross-sectional view taken along the line 5—5 in FIG. 3 and looking in the direction of the arrows;

FIG. 6 is a side elevation view showing the cover plate of the assembly;

FIG. 7 is a front elevation view of the cover plate;

FIG. 8 is a cross-sectional view taken along the line 8—8 in FIG. 7 and looking in the direction of the arrows; and FIG. 9 is a top plan view of the cover plate.

DESCRIPTION OF THE PREFERRED EMBODIMENT

Figure 1:
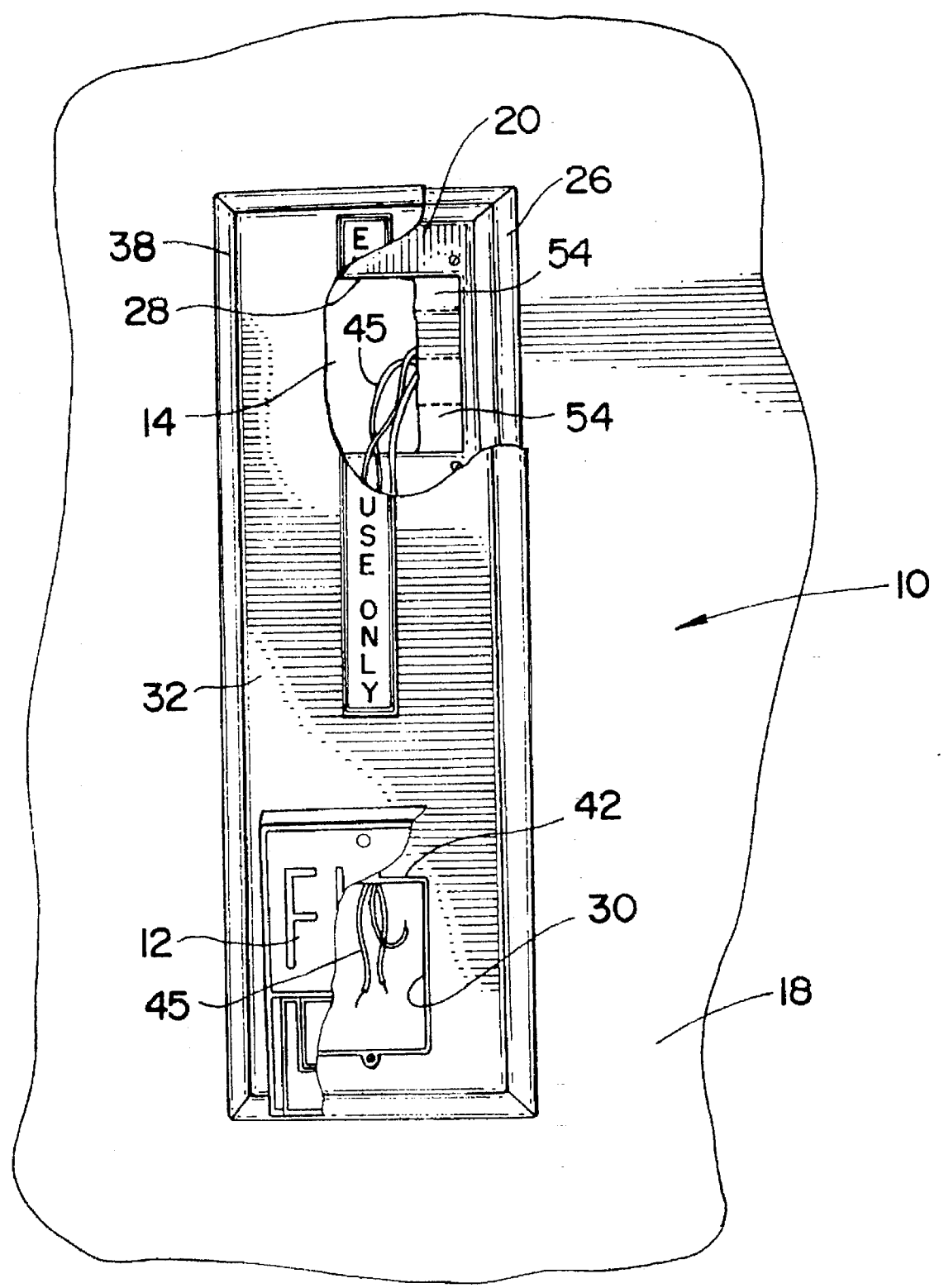
FIG. 1 is a fragmentary front elevation view showing the assembly of this invention mounted on a wall.

With reference now to the drawings, wherein like reference characters designate like or corresponding parts throughout the several views, there is shown a raceway assembly 10 for repositioning a conventional electrical fire alarm pull station 12 from a first position 14 to a second position 16 on a wall 18.

In accordance with the invention, assembly 10 includes a base plate 20 which defines a first front flat surface 22, a second opposed rear flat surface 24, a first bevelled edge 26 surrounding surfaces 22, 24, a first opening 28 and a second opening 30.

Assembly 10 further includes a cover plate 32 defining a third front flat surface 34, a fourth rear flat surface 36, a second bevelled edge 38 surrounding surfaces 34, 36, and a third opening 40.

Assembly 10 also includes a conventional electrical junction box 42 positioned within and extending through second opening 30 and attached to base plate 20 in a conventional manner, such as by spot welding.

Assembly 10 further includes first means generally indicated at 44 for attaching base plate 20 to wall 18 with first opening 28 located at first position 14 and with junction box 42 located at second position 16. Assembly 10 also includes second means generally indicated at 46 for attaching cover plate 32 to base plate 20 with junction box 42 positioned at third opening 40.

First bevelled edge 26 defines a first apex portion 26' which projects a first predetermined distance A from front surface 22. Junction box 42 defines a forward edge 42' which also is located distance A from front surface 22. This is best seen in FIG. 5. Forward edge 42' of junction box 42 is positioned in flush alignment with cover plate 32 when cover plate 32 is attached to base plate 20 by second attaching means 46. Second attaching means 46 include openings 48 through cover plate 32 and openings 50 through base plate 20. A plurality of screws or other conventional fastening elements (not shown) are inserted through openings 48, 50 to attach cover plate 32 to base plate 20. Similarly, first attaching means 44 include a plurality of openings 52 within base plate 20, and a plurality of screws or other conventional fastening elements (not shown) are inserted through openings 52 to attach base plate 20 to wall 18.

When cover plate 32 is attached to base plate 20, second bevelled edge 38 is positioned over and in nesting relationship with first bevelled edge 26. Second bevelled edge 38 defines an outer perimeter edge 38' which is located distance A from fourth rear flat surface 36 so that second bevelled edge 38 completely covers first bevelled edge 26 when cover plate 32 is attached to base plate 20.

In accordance with the invention, a conventional fire alarm pull station 12 is conventionally connected to junction box 42. The electrical wiring 45 which provided electrical power to fire alarm pull station 12 when it was located at first position 14 is extended from first position 14 downwardly. The wiring is electrically connected in a conventional manner to fire alarm pull station 12 by extending the wiring through conventional grommeted openings (not shown) within junction box 42. The electrical wiring 45 is located between base plate 20 and cover plate 32 when assembly 10 is assembled and attached to wall 18.

In accordance with the invention, assembly 10 preferably includes a plurality of so-called knock-out elements 54 removably connected in a conventional manner to base plate 20 and to each other and covering first opening 28 so that the size of opening 28 can be quickly and easily changed by removing a selected number of removable elements 54.

In assembling, installing and using assembly 10, conventional fire alarm pull station 12 is removed from its location at position 14 on wall 18. A new opening is then formed in wall 18 in a conventional manner at second position 16 for receiving a rearward portion 43 of junction box 42 therein.

Base plate 20, with conventional junction box 42 attached thereto within opening 30, as previously described, is then connected to wall 18 by use of screws or other conventional fastening elements (not shown) inserted through openings 52. Base plate 20 is positioned with rear surface 24 against wall 18. Base plate 20 is connected to wall 18 after a suitable number of knock-out elements 54 have been removed to permit wiring 45 which was connected to pull station 12 to be fed through opening 28. Base plate 20 is connected to wall 18 with opening 28 located at first position 14 and with junction box 42 located at second position 16 and within the new opening (not shown) which has been formed in wall 18 to receive junction box 42 therein. Wiring 45 is then pulled through opening 28 and downwardly into junction box 42.

Cover plate 32 is then positioned over base plate 20 and is attached thereto by use of screws or other conventional fastening elements (not shown) which pass through openings 48, 50 in cover plate 32 and base plate 20, respectively. The configuration of assembly 10 is such that opening 40 within cover plate 32 is located at second position 16, and bevelled edge 38 covers and nests with bevelled edge 26. Fire alarm pull station 12 is then physically and electrically connected to junction box 42 in a conventional manner.

This invention provides for a raceway assembly to permit an electrical fire alarm pull station to be quickly and easily repositioned to a lower location on a wall to comply with the federal Americans With Disabilities Act regulations. The pull station is repositioned without requiring patching of the wall to cover the opening in the wall where the pull station was originally located. The low side profile of the assembly mounted on the wall and the covering of the wiring between positions 14 and 16 by cover plate 32 provides a pleasing appearance with minimal intrusion into the adjacent hallway or room space. Assembly 10 will protrude only the distance A from wall 18 because rearward portion 43 of junction box 42 is positioned through the new opening in wall 18 at position 16. Base plate 20 and cover plate 32 are preferably made of metal, and bevelled edges 26, 38 are preferably formed by bending and deforming the metal in a press in a conventional manner.

The invention in its broader aspects is not limited to the specific details shown and described, and departures may be made from such details without departing from the principles of the invention and without sacrificing its chief advantages.

What is claimed is:

1. A raceway assembly for repositioning an electrical fire alarm from a first position to a second position on a wall, said assembly comprising:

a base plate defining a first front surface, a second opposed rear surface, a first bevelled edge substantially surrounding said surfaces, a first opening and a second opening;

a cover plate defining a third front surface, a fourth opposed rear surface, a second bevelled edge substantially surrounding said third and fourth surfaces and a third opening;

an electrical junction box positioned within and extending through said second opening and attached to said base plate;

first means in operative relationship with said base plate for attaching said base plate to said wall with said first opening located at said first position and with said junction box located at said second position; and second means in operative relationship with said cover plate and with said base plate for attaching said cover plate to said base plate with said junction box positioned at said third opening.

2. An assembly as in claim 1 wherein said first bevelled edge defines a first apex portion projecting a first predetermined distance from said first front surface and wherein said junction box defines a forward edge located substantially said first predetermined distance from said first front surface.

3. An assembly as in claim 2 wherein said forward edge of said junction box is in substantially flush alignment with said cover plate when said cover plate is attached to said base plate by said second attaching means.

4. An assembly as in claim 3 wherein said second bevelled edge is positioned over said first bevelled edge when said cover plate is attached to said base plate.

5. An assembly as in claim 4 wherein said second bevelled edge defines an outer perimeter edge which is located substantially said first predetermined distance from said fourth rear surface, whereby said second bevelled edge substantially completely covers said first bevelled edge when said cover plate is attached to said base plate.

6. An assembly as in claim 5 further including a fire alarm pull station connected to said junction box.

7. An assembly as in claim 6 wherein electrical wiring extends from said first position to said fire alarm pull station and is located between said base plate and said cover plate when said assembly is attached to said wall.

8. An assembly as in claim 1 further including a plurality of elements removably connected to said base plate and covering said first opening, whereby the size of said first opening can be changed by removing a selected number of said removable elements.

9. An assembly as in claim 1 wherein said second position is lower than said first position on said wall.

10. An assembly as in claim 1 wherein said first front surface, said second rear surface, said third front surface and said fourth rear surface are substantially flat.

* * * * *